US011506390B2

(12) United States Patent
Snyder (10) Patent No.: US 11,506,390 B2
(45) Date of Patent: Nov. 22, 2022

(54) MULTI-FUEL BLUFF-BODY PILOTED HIGH-SHEAR INJECTOR AND METHOD OF USING SAME (71) Applicant: United Technologies Corporation, Farmington, CT (US)

(72) Inventor: Timothy S. Snyder, Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 282 days.

(21) Appl. No.: 16/705,658

(22) Filed: Dec. 6, 2019

(65) Prior Publication Data
US 2021/0172413 A1 Jun. 10, 2021

(51) Int. Cl.
F23R 3/36 (2006.01)
F23R 3/14 (2006.01)
F23R 3/28 (2006.01)

(52) U.S. Cl.
CPC ............ F23R 3/36 (2013.01); F23R 3/14 (2013.01); F23R 3/286 (2013.01)

(58) Field of Classification Search
CPC ............ F23R 3/36; F23R 3/14; F23R 3/286
See application file for complete search history.

(56) References Cited

U.S. PATENT DOCUMENTS

| 5,365,738 A * | 11/1994 | Etheridge | F23D 17/002 239/126 |
| 5,394,685 A | 3/1995 | Kesten | |
| 5,457,953 A | 10/1995 | Etheridge | |
| 6,176,087 B1 | 1/2001 | Snyder | |
| 6,813,890 B2 | 11/2004 | Martling | |
| 7,162,864 B1 | 1/2007 | Schefer | |
| 9,182,124 B2 | 11/2015 | Oskam | |
| 9,464,573 B2 | 10/2016 | Remy | |
| 9,476,357 B2 | 10/2016 | Owens | |
| 10,100,748 B2 | 10/2018 | Kawai | |
| 2010/0071667 A1 | 3/2010 | Hicks | |
| 2013/0219899 A1* | 8/2013 | Uhm | F23D 14/08 60/738 |
| 2015/0135723 A1 | 5/2015 | Belyaev | |
| 2016/0123226 A1 | 5/2016 | Razak | |
| 2017/0298884 A1 | 10/2017 | Patel | |
| 2019/0162414 A1 | 5/2019 | Ogata | |

FOREIGN PATENT DOCUMENTS

EP 2902708 B1 2/2017
JP 3069347 7/2000

OTHER PUBLICATIONS

EP search report for EP20211488.0 dated Apr. 22, 2021.

* cited by examiner

Primary Examiner — Katheryn A Malatek
(74) Attorney, Agent, or Firm — Getz Balich LLC (57) ABSTRACT A method for operating a fuel injector of a gas turbine engine includes injecting a hydrogen-based primary fuel from a primary fuel passage of the fuel injector directly into a combustion chamber. The primary fuel passage includes a primary fuel outlet located within the combustion chamber. The method further includes injecting a second fuel, different than the hydrogen-based primary fuel, from a secondary fuel passage of the fuel injector into a hood chamber separated from the combustion chamber by a bulkhead. The secondary fuel passage includes a plurality of secondary fuel outlets located within the hood chamber.

19 Claims, 5 Drawing Sheets

MULTI-FUEL BLUFF-BODY PILOTED HIGH-SHEAR INJECTOR AND METHOD OF USING SAME

BACKGROUND

1. Technical Field

This disclosure relates generally to combustors for gas turbine engines, and more particularly to fuel injectors for use in a combustor.

2. Background Information

Combustors, such as those used in gas turbine engines, may generally include radially spaced inner and outer shells which define a combustion chamber therebetween. A bulkhead may be provided at the forward end of the combustion chamber to shield a forward section of the combustor from the relatively high temperatures in the combustion chamber. A series of fuel injectors may be used to inject fuel, air, and other fluids through the bulkhead and into the combustion chamber. Swirlers may be disposed downstream of the fuel injectors to provide mixing of the fluids injected by the fuel injectors.

However, conventional combustor and fuel injector configurations may be challenged by ground lighting as well as altitude starting within the combustor. Combustors may also experience greater than desired formation of non-volatile particulates/smoke during combustion. Accordingly, what is needed is an improved fuel injector which addresses one or more of the above-noted concerns.

SUMMARY

It should be understood that any of all of the features or embodiments described herein can be used or combined in any combination with each and every other feature or embodiment described herein unless expressly noted otherwise.

According to an embodiment of the present disclosure, a method for operating a fuel injector of a gas turbine engine includes injecting a hydrogen-based primary fuel from a primary fuel passage of the fuel injector directly into a combustion chamber. The primary fuel passage includes a primary fuel outlet located within the combustion chamber. The method further includes injecting a second fuel, different than the hydrogen-based primary fuel, from a secondary fuel passage of the fuel injector into a hood chamber separated from the combustion chamber by a bulkhead. The secondary fuel passage includes a plurality of secondary fuel outlets located within the hood chamber.

In the alternative or additionally thereto, in the foregoing embodiment, the combustion chamber is defined between an inner shell and an outer shell and the bulkhead extends between the inner shell and the outer shell.

In the alternative or additionally thereto, in the foregoing embodiment, the bulkhead includes at least one opening extending between the combustion chamber and the hood chamber. The method further includes providing a swirler extending through the at least one opening and located radially outside of the fuel injector with respect to a fuel injector center axis. The swirler includes a swirler exit plane defined by a downstream end of the swirler.

In the alternative or additionally thereto, in the foregoing embodiment, a primary fuel output of the primary fuel passage is between 0.1 and 5.0 percent, inclusive, of a total fuel output of the primary fuel passage and the secondary fuel passage.

In the alternative or additionally thereto, in the foregoing embodiment, the primary fuel outlet is located at or downstream of the swirler exit plane.

In the alternative or additionally thereto, in the foregoing embodiment, a downstream end of the fuel injector includes a tip surface and the primary fuel outlet is located in a center of the tip surface.

In the alternative or additionally thereto, in the foregoing embodiment, the tip surface is located at or downstream of the swirler exit plane.

In the alternative or additionally thereto, in the foregoing embodiment, the method further includes injecting a cooling air from a cooling air passage into the combustion chamber. The cooling air passage includes a plurality of air outlets located in the tip surface radially outside of the primary fuel outlet with respect to the fuel injector center axis.

In the alternative or additionally thereto, in the foregoing embodiment, the plurality of secondary fuel outlets is disposed along a fuel injector plane located upstream of the swirler exit plane.

According to another embodiment of the present disclosure, a combustor for a gas turbine engine includes a combustion chamber. The combustor further includes a hood chamber separated from the combustion chamber by a bulkhead. The bulkhead includes at least one opening extending between the hood chamber and the combustion chamber. The combustor further includes a fuel injector extending through the at least one opening. The fuel injector includes a primary fuel passage including a primary fuel outlet located within the combustion chamber. The fuel injector further includes a secondary fuel passage including a plurality of secondary fuel outlets located within the hood chamber. The primary fuel passage is configured to inject a hydrogen-based primary fuel directly into the combustion chamber and the secondary fuel passage is configured to inject a secondary fuel, different than the hydrogen-based primary fuel, into the combustion chamber.

In the alternative or additionally thereto, in the foregoing embodiment, the combustion chamber is defined between an inner shell and an outer shell and the bulkhead extends between the inner shell and the outer shell.

In the alternative or additionally thereto, in the foregoing embodiment, the combustor further includes a swirler extending through the at least one opening and located radially outside of the fuel injector with respect to a fuel injector center axis. The swirler includes a swirler exit plane defined by a downstream end of the swirler.

In the alternative or additionally thereto, in the foregoing embodiment, the primary fuel outlet is located at or downstream of the swirler exit plane.

In the alternative or additionally thereto, in the foregoing embodiment, a downstream end of the fuel injector includes a tip surface and the primary fuel outlet is located in a center of the tip surface.

In the alternative or additionally thereto, in the foregoing embodiment, the tip surface is located at or downstream of the swirler exit plane.

In the alternative or additionally thereto, in the foregoing embodiment, the tip surface is substantially parallel to the swirler exit plane.

In the alternative or additionally thereto, in the foregoing embodiment, the fuel injector further includes a cooling air passage comprising a plurality of air outlets located in the tip surface radially outside of the primary fuel outlet with respect to the fuel injector center axis.

In the alternative or additionally thereto, in the foregoing embodiment, a primary fuel output of the primary fuel passage is between 0.1 and 5.0 percent, inclusive, of a total fuel output of the primary fuel passage and the secondary fuel passage.

In the alternative or additionally thereto, in the foregoing embodiment, the tip surface is disposed downstream of the bulkhead.

According to another embodiment of the present disclosure, a combustor for a gas turbine engine includes a combustion chamber. The combustor further includes a hood chamber separated from the combustion chamber by a bulkhead. The bulkhead includes at least one opening extending between the hood chamber and the combustion chamber. The combustor further includes a swirler extending through the at least one opening. The swirler includes a swirler exit plane defined by a downstream end of the swirler. The combustor further includes a fuel injector extending through the swirler. A downstream end of the fuel injector includes a tip surface located at or downstream of the swirler exit plane. The tip surface extends substantially parallel to the swirler exit plane. The fuel injector includes a primary fuel passage including a primary fuel outlet located within the combustion chamber. The primary fuel outlet is located in a radial center of the tip surface with respect to a fuel injector center axis. The fuel injector further includes a secondary fuel passage including a plurality of secondary fuel outlets located within the hood chamber. The primary fuel passage is configured to inject a hydrogen-based primary fuel directly into the combustion chamber and the secondary fuel passage configured to inject a secondary fuel, different than the hydrogen-based primary fuel, into the combustion chamber. The fuel injector further includes a cooling air passage including a plurality of air outlets located in the tip surface radially outside of the primary fuel outlet with respect to the fuel injector center axis.

The present disclosure, and all its aspects, embodiments and advantages associated therewith will become more readily apparent in view of the detailed description provided below, including the accompanying drawings.

DETAILED DESCRIPTION

It is noted that various connections are set forth between elements in the following description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Figure 1:
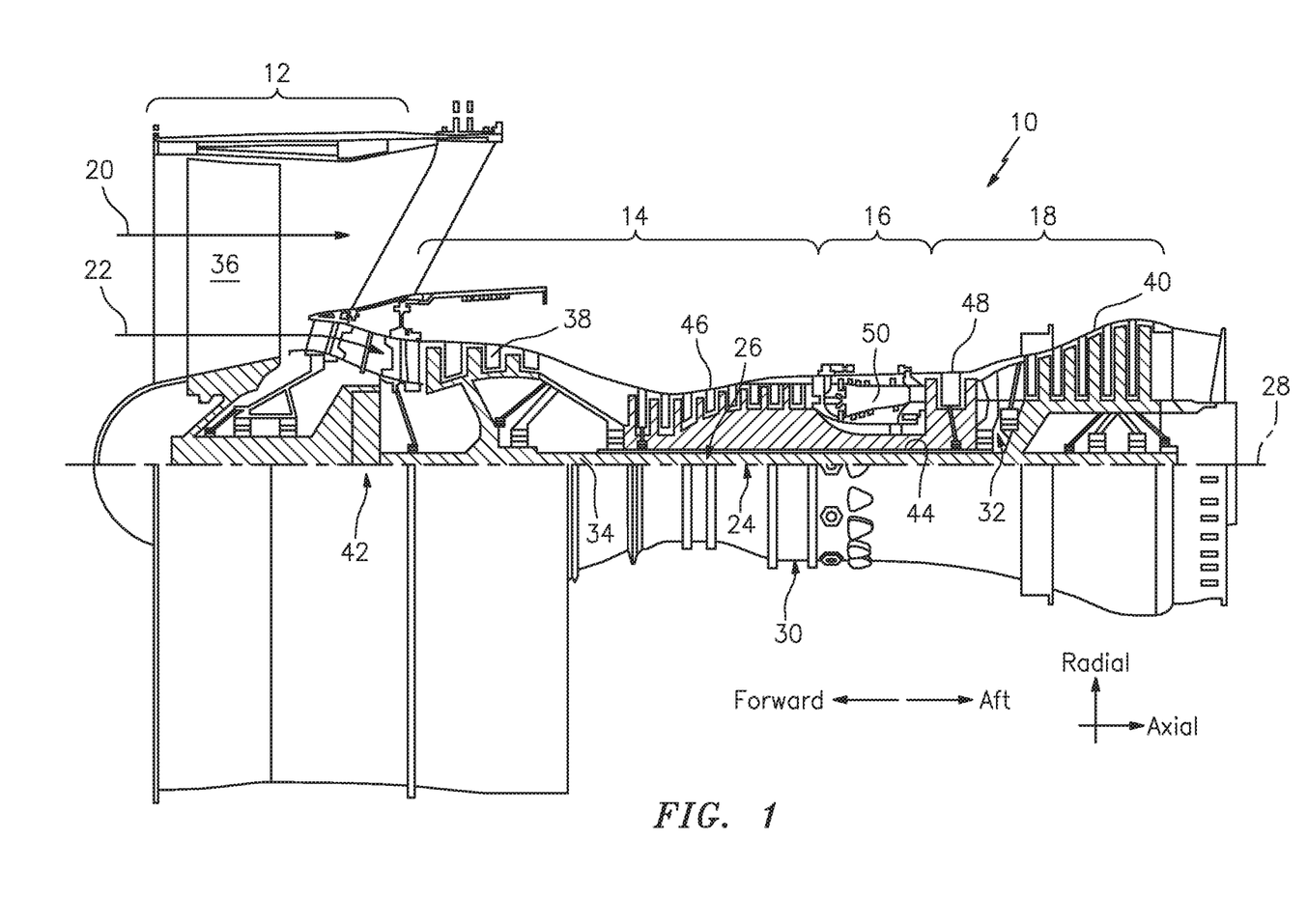
FIG. 1 illustrates a side cross-sectional view of a gas turbine engine in accordance with one or more embodiments of the present disclosure.

Referring to FIG. 1, an exemplary gas turbine engine 10 is schematically illustrated. The gas turbine engine 10 is disclosed herein as a two-spool turbofan engine that generally includes a fan section 12, a compressor section 14, a combustor section 16, and a turbine section 18. The fan section 12 drives air along a bypass flowpath 20 while the compressor section 14 drives air along a core flowpath 22 for compression and communication into the combustor section 16 and then expansion through the turbine section 18. Although depicted as a turbofan gas turbine engine in the disclosed non-limiting embodiments, it should be understood that the concepts described herein are not limited to use with turbofans as the teachings may be applied to other types of turbine engines including those with three-spool architectures.

The gas turbine engine 10 generally includes a low-pressure spool 24 and a high-pressure spool 26 mounted for rotation about a longitudinal centerline 28 of the gas turbine engine 10 relative to an engine static structure 30 via one or more bearing systems 32. It should be understood that various bearing systems 32 at various locations may alternatively or additionally be provided.

The low-pressure spool 24 generally includes a first shaft 34 that interconnects a fan 36, a low-pressure compressor 38, and a low-pressure turbine 40. The first shaft 34 is connected to the fan 36 through a gear assembly of a fan drive gear system 42 to drive the fan 36 at a lower speed than the low-pressure spool 24. The high-pressure spool 26 generally includes a second shaft 44 that interconnects a high-pressure compressor 46 and a high-pressure turbine 48. It is to be understood that "low pressure" and "high pressure" or variations thereof as used herein are relative terms indicating that the high pressure is greater than the low pressure. An annular combustor 50 is disposed between the high-pressure compressor 46 and the high-pressure turbine 48 along the longitudinal centerline 28. The first shaft 34 and the second shaft 44 are concentric and rotate via the one or more bearing systems 32 about the longitudinal centerline 28 which is collinear with respective longitudinal centerlines of the first and second shafts 34, 44.

Airflow along the core flowpath 22 is compressed by the low-pressure compressor 38, then the high-pressure compressor 46, mixed and burned with fuel in the combustor 50, and then expanded over the high-pressure turbine 48 and the low-pressure turbine 40. The low-pressure turbine 40 and the high-pressure turbine 48 rotationally drive the low-pressure spool 24 and the high-pressure spool 26, respectively, in response to the expansion.

Figure 2:
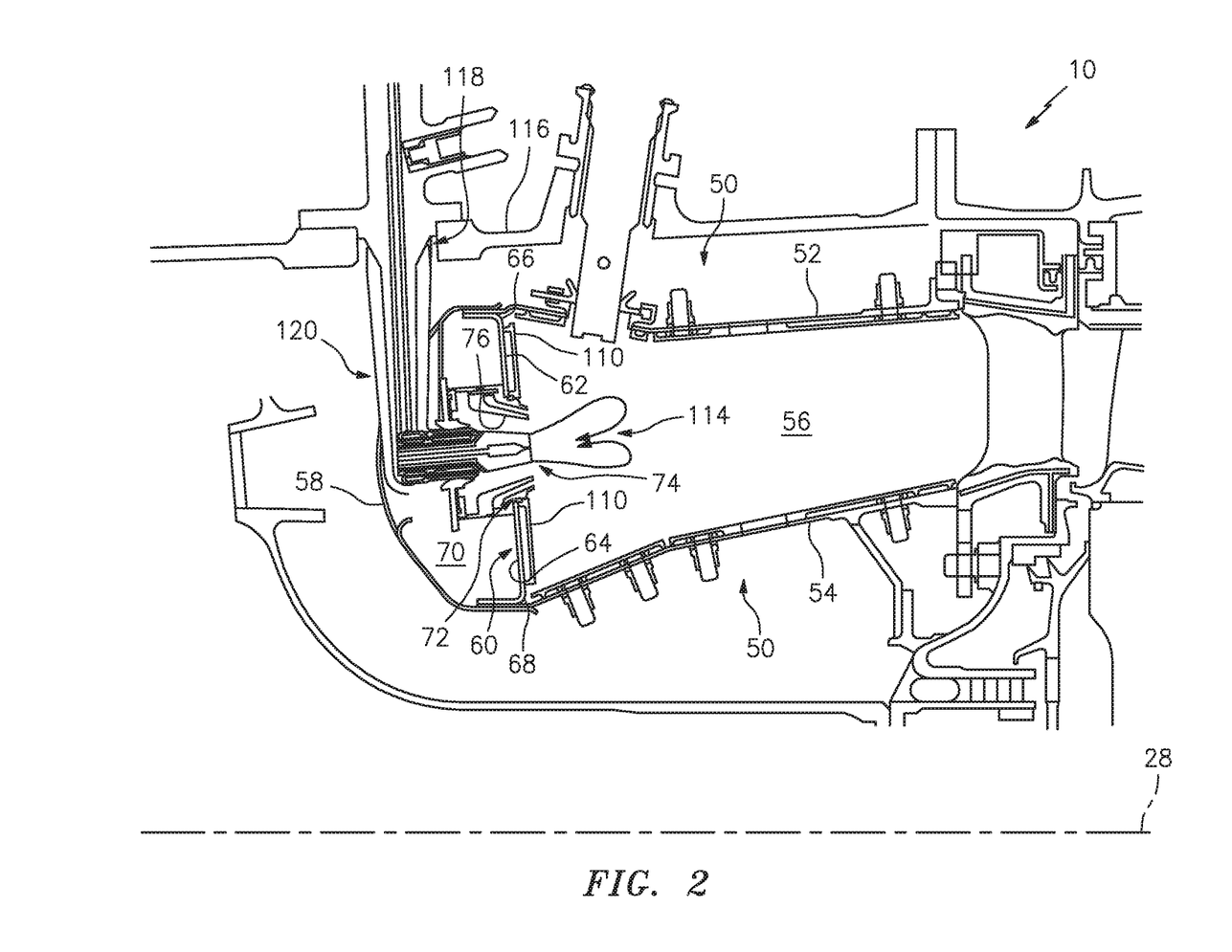
FIG. 2 illustrates a cross-sectional view of an exemplary combustor of a gas turbine engine in accordance with one or more embodiments of the present disclosure.

Referring to FIG. 2, the combustor 50 includes an annular outer shell 52 and an annular inner shell 54 spaced radially inward of the outer shell 52, thus defining an annular combustion chamber 56 therebetween. An annular hood 58 is positioned axially forward of the outer shell 52 and the inner shell 54 and spans between and sealably connects to respective forward ends of the outer shell 52 and the inner shell 54. It should be understood that relative positional terms, such as "forward," "aft," "upper," "lower," "above," "below," and the like are relative to the normal operational attitude of the gas turbine engine 10 and should not be considered otherwise limiting.

A bulkhead 60 includes a first side 62 facing the combustion chamber 56 and a second side 64 opposite the first side 62. The bulkhead 60 further includes an outer radial end 66 and an inner radial end 68 opposite the outer radial end 66. The bulkhead 60 may be connected to and extend between the outer shell 52 and the inner shell 54. For example, the bulkhead 60 may be connected to the outer shell 52 at the outer radial end 66 while the bulkhead 60 may be connected to the inner shell 54 at the inner radial end 68. The bulkhead 60 divides the combustion chamber 56 and a hood chamber 70 (i.e., the combustion chamber 56 is disposed downstream of the bulkhead 60 while the hood chamber 70 is disposed upstream of the bulkhead 60). The bulkhead 60 may include an annular heat shield 110 mounted to the first side 62 of the bulkhead 60 and generally serving to thermally protect the bulkhead 60 and forward portions of the combustor 50, such as the hood chamber 70.

The bulkhead 60 includes at least one opening 72 extending through bulkhead 60 between the combustion chamber 56 and the hood chamber 70. Each opening of the at least one opening 72 may accommodate a respective fuel injector 74 extending through the respective opening of the at least one opening 72 from the hood chamber 70 into the combustion chamber 56. The fuel injector 74 may be configured to provide a mixture of fuel, air, and/or additional fluids for combustion in the combustion chamber 56.

Figure 3:
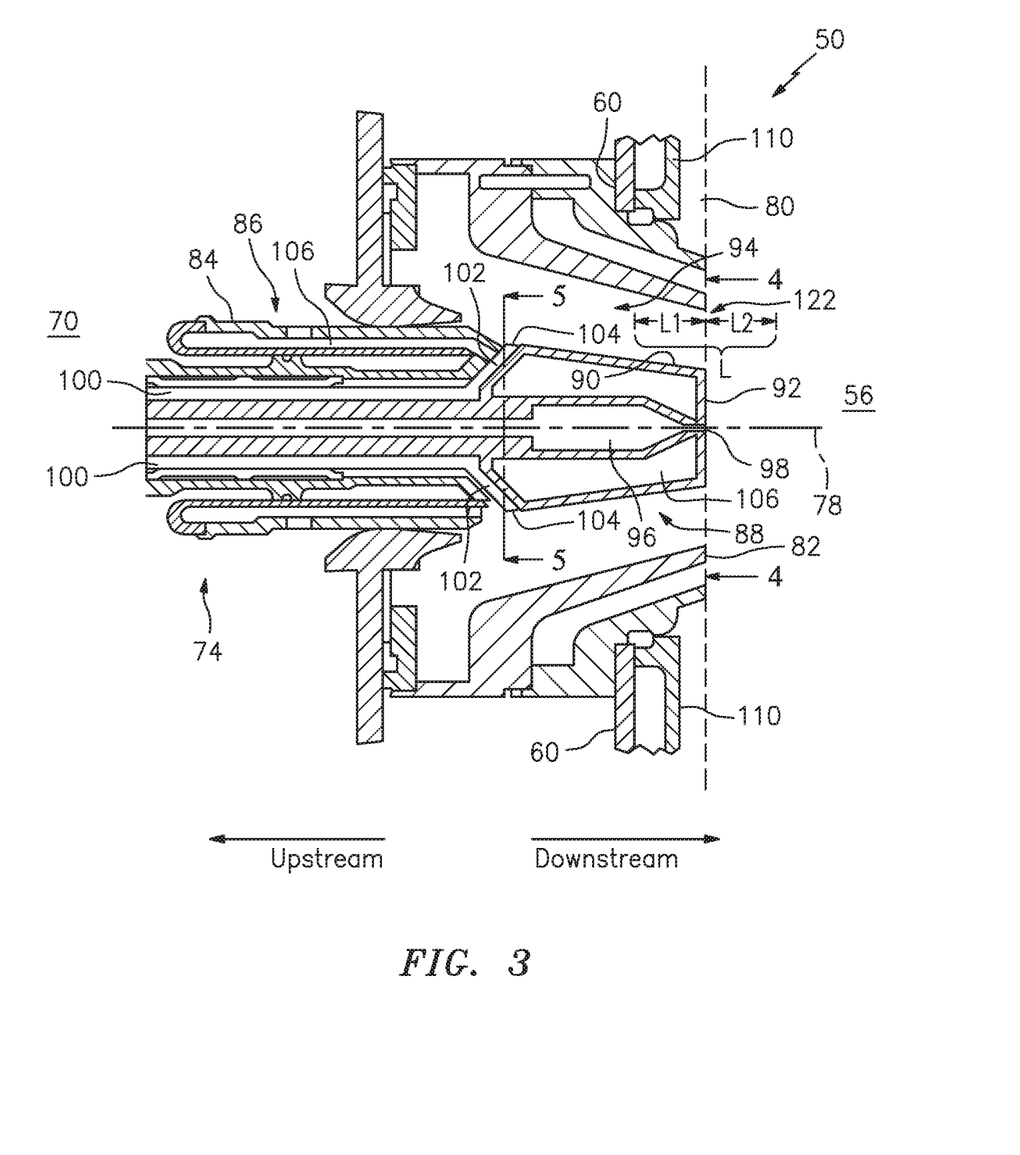
FIG. 3 illustrates a side cross-sectional view a fuel injector of the combustor of FIG. 2 in accordance with one or more embodiments of the present disclosure.

Referring to FIGS. 2 and 3, each opening of the at least one opening 72 may additionally include a swirler 76 mounted in the hood chamber 70 and extending through a respective opening of the at least one opening 72 from the hood chamber 70 into the combustion chamber 56. The swirler 76 may be radially disposed about the fuel injector 74 with respect to a fuel injector center axis 78. Accordingly, some or all of the fuel, air, and/or other fluids provided by the fuel injector 74 may pass through the swirler 76 which may provide additional mixing of the fuel, air, and/or other fluids. The swirler 76 may include a swirler exit plane 80 defined by a downstream end 82 of the swirler 76. The swirler exit plane 80 may be disposed within the combustion chamber 56 downstream of the bulkhead 60.

Figure 4:
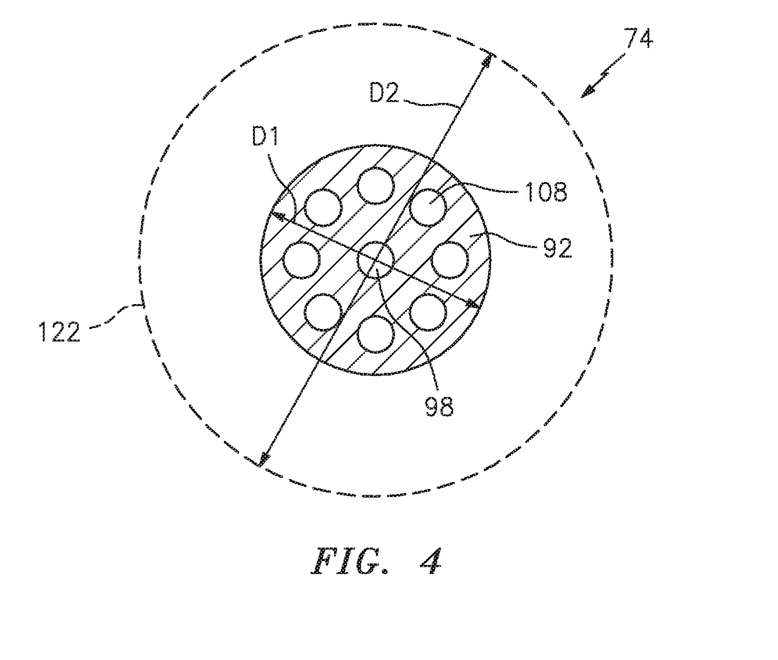
FIG. 4 illustrates a cross-sectional view of the fuel injector of FIG. 3 taken along line 4-4 in accordance with one or more embodiments of the present disclosure.
Figure 5:
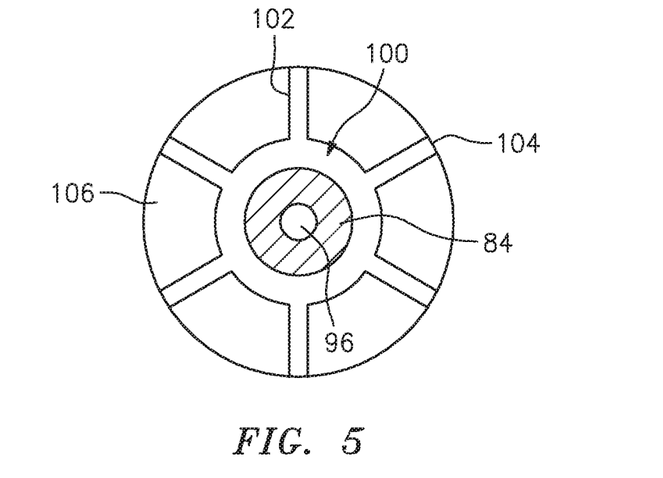
FIG. 5 illustrates a cross-sectional view of the fuel injector of FIG. 3 taken along line 5-5 in accordance with one or more embodiments of the present disclosure.

Referring to FIGS. 3-5, the fuel injector 74 includes a fuel injector body 84 having an upstream portion 86 and a bluff body portion 88 disposed downstream from the upstream portion 86. The bluff body portion 88 includes an outer radial surface 90 and a tip surface 92 disposed at a downstream end of the fuel injector 74 and facing the combustion chamber 56. An annular swirler passage 94 may be radially defined between the swirler 76 and the outer radial surface 90 with respect to the fuel injector center axis 78. In various embodiments, the tip surface 92 may extend radially with respect to the fuel injector center axis. In various embodiments, the tip surface 92 may alternatively or additionally extend substantially parallel to the swirler exit plane 80 (i.e., the tip surface 92 may extend at an angle of five degrees or less relative to the swirler exit plane 80). In various embodiments, the tip surface 92 may be planar while in other embodiments the tip surface 92 may be convex or concave, may include one or more projections extending from the tip surface 92, etc. In various embodiments, a diameter D1 of the tip surface 92 may be greater than twenty percent of a diameter D2 of an opening 122 of the swirler 76 at the downstream end 82 (e.g., along the swirler exit plane 80). In various other embodiments, the diameter D1 of the tip surface 92 may be greater than forty percent of the diameter D2 of the opening 122 of the swirler 76 at the downstream end 82.

The fuel injector 74 includes a primary fuel passage 96 configured to direct fuel through the fuel injector body 76 and to inject the fuel directly into the combustion chamber 56 via a primary fuel outlet 98. The primary fuel outlet 98 is located in the tip surface 92 of the bluff body portion 88. In various embodiments, the primary fuel outlet 98 may be radially centered in the tip surface 92 with respect to the fuel injector center axis 78.

The fuel injector 74 includes a secondary fuel passage 100 having a plurality of secondary fuel passage branches 102. The secondary fuel passage 100 is configured to direct fuel through the fuel injector body 76 and into the combustion chamber 56 via a plurality of secondary fuel outlets 104 corresponding to the respective plurality of secondary fuel passage branches 102. The plurality of secondary fuel outlets 104 may be located upstream of the primary fuel outlet 98 along a fuel injector plane 106 which may be located upstream or downstream of the bulkhead 60. The plurality of secondary fuel outlets 104 may be circumferentially spaced about the exterior of the fuel injector 74 between the upstream portion 86 and the bluff body portion 88 of the fuel injector body 84. The fuel injector plane 106 may be substantially parallel to the swirler exit plane 80 (i.e., the fuel injector plane 106 may be oriented at an angle of five degrees or less relative to the swirler exit plane 80). Fuel exiting the fuel injector 74 via the plurality of secondary fuel outlets 104 may be directed into the annular swirler passage 94 and subsequently into the combustion chamber 56.

The secondary fuel passage 100 is configured to convey a conventional aircraft fuel, for example, jet A fuel, for injection into the combustion chamber 56. The primary fuel passage 96 disclosed herein is configured to convey a hydrogen-based fuel for injection into the combustion chamber 56. For example, the primary fuel passage 96 may direct a fuel which is pure or substantially pure hydrogen. As used here, the term "hydrogen-based" fuel will refer to fuel including greater than or equal to ninety percent hydrogen by volume. The hydrogen-based fuel may take various forms, for example, liquid hydrogen, compressed gaseous hydrogen, etc.

In various embodiments, a primary fuel output of the primary fuel passage 96 may be between 0.1 and 5.0 percent, inclusive, of a total fuel output of the primary fuel passage 96 and the secondary fuel passage 100. In various embodiments, the primary fuel output of the primary fuel passage 96 may be between 1.0 and 3.0 percent, inclusive, of the total fuel output of the primary fuel passage 96 and the secondary fuel passage 100. As an energy density of liquid hydrogen or compressed gaseous hydrogen may be substantially less than an energy density of conventional aircraft fuel (e.g., jet A fuel), the primary fuel passage 96 of the present disclosure may have a greater diameter to provide sufficient primary fuel output in comparison to a primary fuel passage configured to convey conventional aircraft fuel. For example, a fuel passage configured to convey a hydrogen-based fuel may have a diameter greater than four times a diameter of a fuel passage configured to convey conventional aircraft fuel. As one of ordinary skill in the art will appreciate, the size of the diameter of the fuel passage may vary based on, for example, a pressure and/or state of the fuel (e.g., liquidized or compressed gas fuel). Accordingly, in various embodiments, an upper limit of the primary fuel output of the primary fuel passage 96 may be based on a diameter of the primary fuel passage 96 which the fuel injector 74 is capable of accommodating based on the dimensions of the corresponding combustor 50 and associated structure of the gas turbine engine 10.

The fuel injector 74 includes a cooling air passage 106 configured to direct cooling air through the fuel injector body 76 and into the combustion chamber 56 via a plurality of air outlets 108. The plurality of air outlets 108 is located in the tip surface 92 of the bluff body portion 88. The plurality of air outlets 108 may be disposed radially outward from the primary fuel outlet 98 with respect to the fuel injector center axis 78. The plurality of air outlets 108 may be circumferentially spaced about the fuel injector center axis 78 along the tip surface 92. Cooling air exiting the plurality of air outlets 108 may mix with fuel exiting the primary fuel outlet 98 to create an anchored flame along the tip surface 92 within the combustion chamber 56.

As shown in FIG. 3, the tip surface 92 may be disposed within the combustion chamber 56 downstream of the bulkhead 60. In other words, the tip surface 92 may be disposed within an entrance 122 of the combustion chamber 56 illustrated in FIG. 3, for example, as extending along a length L which may be parallel to the fuel injector center axis 78. The length L includes a first length L1 extending between the bulkhead 60 and the swirler exit plane 80. The length L also includes a second length L2 extending between the swirler exit plane 80 and a downstream position within the combustion chamber 56. In various embodiments, the first length L1 may be equal to the second length L2.

For example, the tip surface 92 may be disposed between the bulkhead 60 and the swirler exit plane 80, between the heat shield 110 and the swirler exit plane 80, along the swirler exit plane 80, or downstream of the swirler exit plane 80 with respect to the fuel injector center axis 78. Accordingly, the primary fuel outlet 98 and the plurality of air outlets 108, disposed in the tip surface 92, may also be disposed between the bulkhead 60 and the swirler exit plane 80, between the heat shield 110 and the swirler exit plane 80, along the swirler exit plane 80, or downstream of the swirler exit plane 80 with respect to the fuel injector center axis 78.

Airflow exiting the plurality of air outlets 108 may be used to cool the tip surface 92 while also mixing with the fuel exiting the primary fuel outlet 98 to create an anchored flame at the tip surface 92. The location of the tip surface 92 within the combustion chamber 56, for example, extending along the swirler exit plane 80, may substantially prevent a central recirculation zone 114 of the combustion chamber 56 from entering and oscillating within the swirler 76 resulting in additional attenuation of acoustic oscillations within the combustor 50. Disposition of the tip surface 92 too far upstream, for example, an upstream distance from the swirler exit plane 80 along the fuel injector center axis 80, may result in reduced attenuation of the acoustic oscillations within the combustor 50. Disposition of the tip surface 92 too far downstream, for example, a downstream distance from the swirler exit plane 80 along the fuel injector center axis 80, may result in increased thermal stress on the fuel injector 74.

The use of a hydrogen-based fuel as the primary fuel may substantially improve ground lighting as well as altitude starting within the combustor 50. Further, the resultant high-temperature central recirculation zone 114 within the combustion chamber 56 may burn out soot to further reduce non-volatile particulates/smoke within the combustion chamber 56. However, because hydrogen has a flame speed approximately eight times greater than a flame speed of conventional aircraft fuel (e.g., jet A fuel) at atmospheric conditions, it may be beneficial to directly inject the hydrogen-based fuel into the combustion chamber 56 at a position downstream from the secondary fuel so that the flame does not propagate upstream (e.g., into the swirler 76) and so that the tip surface 92 of the bluff body portion 88 of the fuel injector 74 can be used to anchor the flame within the combustion chamber 56.

Figure 6:
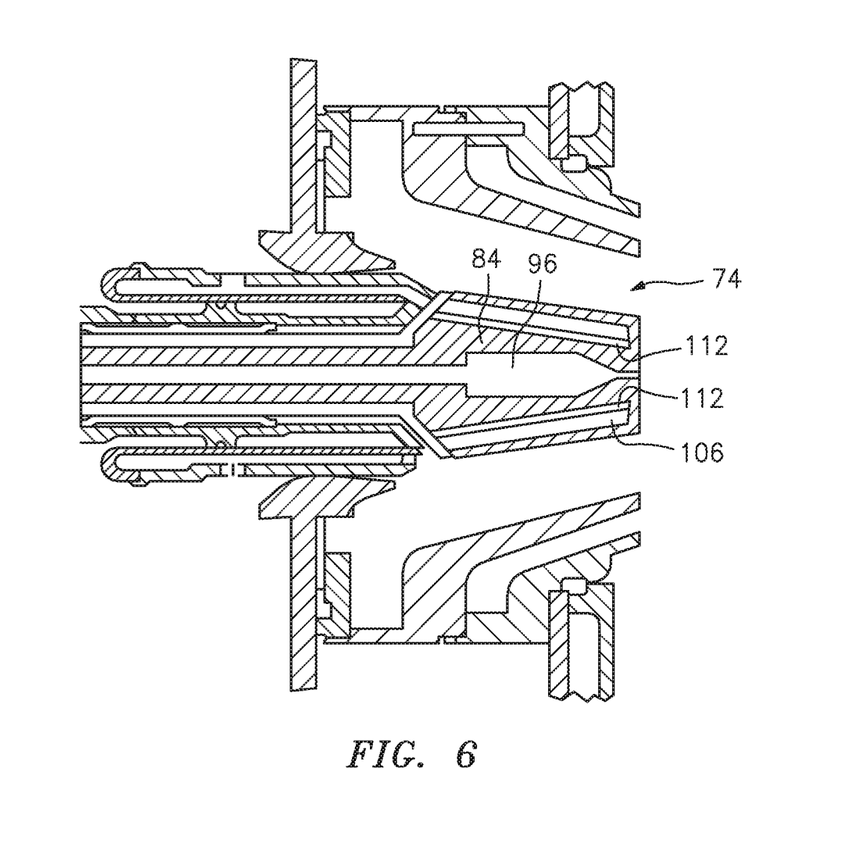
FIG. 6 illustrates a side cross-sectional view a fuel injector of the combustor of FIG. 2 in accordance with one or more embodiments of the present disclosure.

Referring to FIG. 6, in various embodiments, the fuel injector 74 may include an annular air gap 112 disposed within the fuel injector body 84 between the primary fuel passage 96 and the cooling air passage 106. The annular air gap 112 may be enclosed by the fuel injector body 84 and radially spaced from the primary fuel passage 96 and the cooling air passage 106 by the fuel injector body 84. For example, the annular air gap 112 may be fluidly isolated from both the primary fuel passage 96 and the cooling air passage 106 by the fuel injector body 84. The location of the annular air gap 112 between the primary fuel passage 96 and the cooling air passage 106 may thermally insulate the fuel passing through the primary fuel passage 96, thereby preventing or reducing coking of the fuel.

Referring again to FIG. 2, in various embodiments, installation of the fuel injector 74 into the combustor 50 may require different structural features of the gas turbine engine 10 compared to gas turbine engines using conventional fuel injectors. For example, a diffuser case 116 or other case, through which the fuel injector 74 passes, may include a larger diffuser case boss hole 118 to accommodate an increased length of the fuel injector 74 along the fuel injector center axis 78. Additionally, for example, the annular hood 58 may include a larger hood hole 120 for installation of the fuel injector 74 into the combustor 50.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

What is claimed is:

1. A combustor for a gas turbine engine, the combustor comprising:
    a combustion chamber;

a hood chamber separated from the combustion chamber by a bulkhead, the bulkhead comprising at least one opening extending between the hood chamber and the combustion chamber;
a fuel injector extending through the at least one opening, the fuel injector comprising a fuel injector body including an outer radial surface and a tip surface which intersects the outer radial surface, the tip surface located at a downstream end of the fuel injector, the fuel injector further comprising a primary fuel passage comprising a primary fuel outlet located in a center of the tip surface within the combustion chamber, the fuel injector further comprising a secondary fuel passage comprising a plurality of secondary fuel outlets located within the hood chamber, at least a portion of the secondary fuel passage being annular and radially outside of the primary fuel passage, the primary fuel passage configured to inject a hydrogen-based primary fuel directly into the combustion chamber and the secondary fuel passage configured to inject a secondary fuel, different than the hydrogen-based primary fuel, into the combustion chamber; and
a swirler extending through the at least one opening and located radially outside of the fuel injector with respect to a fuel injector center axis, the swirler extending from a first axial end to a second axial end, the first axial end spaced upstream of the at least one opening and the second axial end spaced downstream of the at least one opening, the second axial end defining a swirler exit plane;
wherein the tip surface extends along the swirler exit plane.

2. The combustor of claim 1, wherein the combustion chamber is defined between an inner shell and an outer shell and wherein the bulkhead extends between the inner shell and the outer shell.

3. The combustor of claim 1, wherein the tip surface extends along the swirler exit plane from the primary fuel outlet to the outer radial surface.

4. The combustor of claim 1, wherein the fuel injector further comprises a cooling air passage comprising a plurality of air outlets located in the tip surface radially outside of the primary fuel outlet with respect to the fuel injector center axis.

5. The combustor of claim 4, wherein the fuel injector includes an annular air gap disposed within the fuel injector body between the primary fuel passage and the cooling air passage.

6. The combustor of claim 5, wherein the annular air gap is enclosed by the fuel injector body and the annular air gap is radially spaced from the primary fuel passage and the cooling air passage by the fuel injector body.

7. The combustor of claim 1, wherein a primary fuel output of the primary fuel passage is between 0.1 and 5.0 percent, inclusive, of a total fuel output of the primary fuel passage and the secondary fuel passage.

8. The combustor of claim 1, wherein the tip surface is disposed downstream of the bulkhead.

9. A combustor for a gas turbine engine, the combustor comprising:
a combustion chamber;
a hood chamber separated from the combustion chamber by a bulkhead, the bulkhead comprising at least one opening extending between the hood chamber and the combustion chamber;
a swirler extending through the at least one opening, the swirler extending from a first axial end to a second axial end, the first axial end spaced upstream of the at least one opening and the second axial end spaced downstream of the at least one opening, the second axial end defining a swirler exit plane at a downstream end of the swirler; and
a fuel injector extending through the swirler, the fuel injector comprising a fuel injector body including an outer radial surface and a tip surface which intersects the outer radial surface, the tip surface located at or downstream of the swirler exit plane, the tip surface extending substantially parallel to the swirler exit plane, the fuel injector comprising:
a primary fuel passage comprising a primary fuel outlet located within the combustion chamber, the primary fuel outlet located in a radial center of the tip surface with respect to a fuel injector center axis;
a secondary fuel passage comprising a plurality of secondary fuel outlets located within the hood chamber, the primary fuel passage configured to inject a hydrogen-based primary fuel directly into the combustion chamber and the secondary fuel passage configured to inject a secondary fuel, different than the hydrogen-based primary fuel, into the combustion chamber; and
a cooling air passage comprising a plurality of air outlets located in the tip surface radially outside of the primary fuel outlet with respect to the fuel injector center axis;
wherein the fuel injector includes an annular air gap disposed within the fuel injector body between the primary fuel passage and the cooling air passage.

10. The combustor of claim 9, wherein the tip surface extends along the swirler exit plane.

11. The combustor of claim 9, wherein the tip surface is substantially parallel to the swirler exit plane from the primary fuel outlet to the outer radial surface.

12. The combustor of claim 9, wherein the annular air gap is enclosed by the fuel injector body and the annular air gap is radially spaced from the primary fuel passage and the cooling air passage by the fuel injector body.

13. A combustor for a gas turbine engine, the combustor comprising:
a combustion chamber;
a hood chamber separated from the combustion chamber by a bulkhead, the bulkhead comprising at least one opening extending between the hood chamber and the combustion chamber;
a swirler extending through the at least one opening and located radially outside of the fuel injector with respect to a fuel injector center axis, the swirler extending from a first axial end to a second axial end, the first axial end located upstream of the at least one opening and the second axial end located at or downstream of the at least one opening, the second axial end defining a swirler opening and a swirler exit plane, the swirler opening having a first diameter; and
a fuel injector extending through the at least one opening, the fuel injector comprising a fuel injector body including an outer radial surface and a tip surface which intersects the outer radial surface, the tip surface located at a downstream end of the fuel injector, the tip surface extending along the swirler exit plane, the tip surface having a second diameter which is greater than forty percent of the first diameter, the fuel injector further comprising a primary fuel passage comprising a primary fuel outlet located in the tip surface, the fuel injector further comprising a secondary fuel passage comprising a plurality of secondary fuel outlets located within the hood chamber, at least a portion of the secondary fuel passage being annular and radially outside of the primary fuel passage, the primary fuel passage configured to inject a hydrogen-based primary fuel directly into the combustion chamber and the secondary fuel passage configured to inject a secondary fuel, different than the hydrogen-based primary fuel, into the combustion chamber.

14. The combustor of claim 13, wherein the combustion chamber is defined between an inner shell and an outer shell and wherein the bulkhead extends between the inner shell and the outer shell.

15. The combustor of claim 13, wherein the tip surface extends along the swirler exit plane from the primary fuel outlet to the outer radial surface.

16. The combustor of claim 13, wherein the fuel injector further comprises a cooling air passage comprising a plurality of air outlets located in the tip surface radially outside of the primary fuel outlet with respect to the fuel injector center axis.

17. The combustor of claim 13, wherein a primary fuel output of the primary fuel passage is between 0.1 and 5.0 percent, inclusive, of a total fuel output of the primary fuel passage and the secondary fuel passage.

18. The combustor of claim 13, wherein the fuel injector includes an annular air gap disposed within the fuel injector body between the primary fuel passage and the cooling air passage.

19. The combustor of claim 18, wherein the annular air gap is enclosed by the fuel injector body and the annular air gap is radially spaced from the primary fuel passage and the cooling air passage by the fuel injector body.

* * * * *